United States Patent
Li et al.

(10) Patent No.: US 11,702,572 B2
(45) Date of Patent: Jul. 18, 2023

(54) TWO-COMPONENT SOLVENTLESS ADHESIVE COMPOSITIONS

(71) Applicants: Dow Global Technologies LLC, Midland, MI (US); Rohm and Haas Company, Collegeville, PA (US)

(72) Inventors: Wenwen Li, Pearland, TX (US); Yinzhong Guo, Pearland, TX (US); Mai Chen, Chicago, IL (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 588 days.

(21) Appl. No.: 16/617,412

(22) PCT Filed: Apr. 4, 2018

(86) PCT No.: PCT/US2018/025982
§ 371 (c)(1),
(2) Date: Nov. 26, 2019

(87) PCT Pub. No.: WO2018/222272
PCT Pub. Date: Dec. 6, 2018

(65) Prior Publication Data
US 2020/0140729 A1 May 7, 2020

Related U.S. Application Data

(60) Provisional application No. 62/516,916, filed on Jun. 8, 2017, provisional application No. 62/512,208, filed on May 30, 2017.

(51) Int. Cl.
| | |
|---|---|
| *C09J 175/08* | (2006.01) |
| *C08G 18/50* | (2006.01) |
| *C08G 18/10* | (2006.01) |
| *C08G 18/32* | (2006.01) |
| *C08G 18/38* | (2006.01) |
| *C08G 18/66* | (2006.01) |
| *C08G 18/80* | (2006.01) |
| *C08G 18/48* | (2006.01) |
| *C08G 18/75* | (2006.01) |
| *B32B 7/12* | (2006.01) |

(52) U.S. Cl.
CPC .......... *C09J 175/08* (2013.01); *C08G 18/10* (2013.01); *C08G 18/3206* (2013.01); *C08G 18/3885* (2013.01); *C08G 18/4812* (2013.01); *C08G 18/4825* (2013.01); *C08G 18/4829* (2013.01); *C08G 18/5084* (2013.01); *C08G 18/6696* (2013.01); *C08G 18/755* (2013.01); *C08G 18/757* (2013.01); *C08G 18/758* (2013.01); *C08G 18/8054* (2013.01); *B32B 7/12* (2013.01)

(58) Field of Classification Search
CPC . C09J 175/08; C08G 18/5084; C08G 18/3885
See application file for complete search history.

(56) References Cited

U.S. PATENT DOCUMENTS

| | | | |
|---|---|---|---|
| 4,507,447 | A | 3/1985 | Yamazaki et al. |
| 8,488,138 | B2 | 7/2013 | Brasse et al. |
| 8,835,009 | B2 | 9/2014 | Shah et al. |
| 2010/0119821 | A1 | 5/2010 | Uemura et al. |
| 2011/0318552 | A1 | 12/2011 | Johnson |
| 2016/0272858 | A1 | 9/2016 | Laferte et al. |

FOREIGN PATENT DOCUMENTS

| | | | | |
|---|---|---|---|---|
| EP | 0546771 | A1 | | 6/1993 |
| JP | 2001172600 | A | * | 6/2001 ............ C09J 175/04 |
| JP | 2004035596 | A | | 2/2004 |
| WO | 2015/168670 | A1 | | 11/2015 |
| WO | 2016/100052 | A1 | | 6/2016 |

OTHER PUBLICATIONS

JP-2001172600-A_Jun. 2001_English Translation.*
PCT/US2018/025982, International Search Report and Written Opinion dated Jul. 13, 2018.

* cited by examiner

*Primary Examiner* — Michael L Leonard
(74) *Attorney, Agent, or Firm* — Quarles & Brady LLP

(57) ABSTRACT

Two-component solventless polyurethane adhesive compositions comprising an isocyanate component and an isocyanate-reactive are disclosed, the compositions comprising an isocyanate component comprising an isocyanate-terminated prepolymer and an isocyanate-reactive component comprising a hydroxy-terminated polyurethane resin, a polyether polyol, a phosphate ester adhesion promoter, and, optionally, a bio-based polyol. Methods for forming laminate structures are also disclosed, the methods comprising forming an adhesive composition by mixing an isocyanate adhesive component comprising an isocyanate-terminated prepolymer and an isocyanate-reactive adhesive component comprising a hydroxy-terminated polyurethane resin, a polyether polyol, a phosphate ester adhesion promoter, and optionally, a bio-based polyol, applying the adhesive composition to a surface of a first substrate, and bringing a surface of a second substrate into contact with the adhesive composition on the surface of the first substrate, thereby forming the laminate structure. Laminate structures are also disclosed.

16 Claims, No Drawings

TWO-COMPONENT SOLVENTLESS ADHESIVE COMPOSITIONS

REFERENCE TO RELATED APPLICATIONS

The present application claims the benefit of U.S. Provisional Application No. 62/512,208, filed on May 30, 2017 and U.S. Provisional Application No. 62/516,916, filed on Jun. 8, 2017.

FIELD OF THE DISCLOSURE

The instant disclosure relates to solventless adhesive compositions. More particularly, the disclosure relates to two-component solventless polyurethane adhesive compositions for use in laminated structures. The disclosed adhesive compositions comprise an isocyanate component comprising an isocyanate-terminated prepolymer, and an isocyanate-reactive component comprising a hydroxy-terminated polyurethane resin, a polyether polyol, a phosphate ester adhesion promoter, and, optionally, a bio-based polyol. The disclosed adhesive compositions exhibit improved properties over current solventless adhesive systems, for example—faster curing than current systems, quicker primary aromatic amine ("PAA") decay, improved ink smearing resistance, better adhesion to metalized films, and so on.

The instant disclosure further relates to methods for forming a laminate structure. More particularly, the disclosed methods comprise forming an adhesive composition by mixing an isocyanate adhesive component comprising an isocyanate-terminated prepolymer and an isocyanate-reactive adhesive component comprising a hydroxy-terminated polyurethane resin, a polyether polyol, a phosphate ester adhesion promoter, and optionally, a bio-based polyol, applying the adhesive composition to a surface of a first substrate, and bringing a surface of a second substrate into contact with the adhesive composition on the surface of the first substrate, thereby forming the laminate structure.

BACKGROUND AND SUMMARY OF THE DISCLOSURE

Adhesive compositions are useful for a wide variety of purposes. For instance, adhesive compositions are used to bond together substrates such as polyethylene, polypropylene, polyester, polyamide, metal, paper, or cellophane to form composite films, i.e., laminates. The use of adhesives in different end-use applications is generally known. For example, adhesives can be used in the manufacture of film/film and film/foil laminates used in the packaging industry, especially for food packaging. Adhesives used in laminating applications, or "laminating adhesives," can be generally placed into three categories: solvent-based, water-based, and solventless. The performance of an adhesive varies by category and by the application in which the adhesive is applied.

Solventless laminating adhesives can be applied up to one hundred percent solids without either organic solvent or an aqueous carrier. Because no organic solvent or water has to be dried from the adhesive upon application, these adhesives can be run at high line speeds. Solvent and water-based laminating adhesives are limited by the rate at which the solvent or water can be effectively dried and removed from the laminate structure after application of the adhesive. For environmental, health, and safety reasons, laminating adhesives are preferably aqueous or solventless. However, solventless adhesives often encounter issues such as slow bond development, slow primary aromatic amine ("PAA") decay, low adhesion to metal surfaces, ink smearing, and poor chemical and thermal resistance, particularly its use in more demanding applications.

Within the category of solventless laminating adhesives, there are many varieties. One particular variety includes two-component, polyurethane-based laminating adhesives. Typically, a two-component polyurethane-based laminating adhesive includes a first component comprising an isocyanate-terminated prepolymer and a second component comprising a polyol. The prepolymer can be obtained by the reaction of excess polyisocyanate with a polyether polyol and/or polyester polyol containing two or more hydroxy groups per molecule. The second component comprises a polyether polyol and/or polyester polyol containing two or more hydroxy groups per molecule. The two components are combined in a predetermined ratio and then applied on a first substrate (also known as a "carrier web"). The first substrate is then brought together with a second substrate to form a laminate structure. Additional layers of substrate can be added to the structure with additional layers of adhesive composition located between each successive substrate. The adhesive is then cured, either at room temperature or elevated temperature, thereby bonding the substrates together.

Further processing of the laminate structure depends upon the curing speed of the adhesive. The curing speed of the adhesive is indicated by the time in which the mechanical bond between the laminated substrates takes to become sufficient to allow for further processing e.g., slitting the laminated film, and the laminate is in compliance with applicable regulations (e.g., food contact regulations). Slow curing speed results in lower conversion efficiency. Two-component solventless laminating adhesives, compared to traditional solvent-containing adhesives, exhibit weak initial bonds and longer time needs to be waited for slitting.

Accordingly, two-component solventless polyurethane-based laminating adhesive compositions with improved bond strength, faster curing speeds, quicker PAA decay, better ink smearing resistance and improved metalized film adhesion are desirable.

Two-component solventless polyurethane adhesive compositions are disclosed. In some embodiments, the solventless adhesive composition includes an isocyanate component including an isocyanate-terminated prepolymer. The solventless adhesive composition further includes an isocyanate-reactive component including a hydroxy-terminated polyurethane resin, a polyether polyol, a phosphate ester adhesion promoter, and optionally, a bio-based polyol. The isocyanate-reactive component, including the hydroxy-terminated polyurethane resin, the polyether polyol, the phosphate ester adhesion promoter, and optionally, the bio-based polyol, reacts with the isocyanate component to generate a cross-linked polymer network. When applied in a laminated structure, phosphate ester functionalities present in the isocyanate-reactive component react/complex with reactive sites on the metalized films or polymer films to improve adhesion.

In some embodiments, the hydroxy-terminated polyurethane resin is the reaction product of a polyisocyanate and a polyol component, wherein the polyol component is present in excess. In some embodiments, the polyisocyanate can be selected from the group consisting of an aliphatic polyisocyanate, a cycloaliphatic polyisocyanate, an aromatic polyisocyanate, and combinations of two or more thereof. In some embodiments, the polyisocyanate can be monomer isocyanates and the blend of monomer isocyanates with polyisocyanates. In some embodiments, the optional bio-based polyol is castor oil. In some embodiments, the isocyanate component and the isocyanate-reactive component are present at a mix ratio of from 100:50 to 100:70 (parts by weight isocyanate component to parts by weight isocyanate-reactive component).

The disclosed adhesive compositions and methods for forming laminate structure provide, relative to existing two-component, solventless, polyurethane adhesive compositions, for faster curing and PAA decay, improved ink smearing resistance, better metalized film adhesion, enhanced foil adhesion, increased chemical and thermal resistance, and more-desirable processability. The disclosed adhesive compositions are suitable for use in a broad range of laminate structures comprising a variety of laminated substrates, including laminating metalized films and a series of polyester, polyolefin films that are typically used in food, medical and industrial packaging applications. In addition, the disclosed adhesive compositions balance curing and pot-life properties through the use of components containing both second and primary hydroxy groups. The functionality of the hydroxy group-containing components is adjusted to tune the reaction rate with the isocyanate component.

DETAILED DESCRIPTION OF THE DISCLOSURE

In some embodiments, the two-component solventless adhesive compositions according to this disclosure include an isocyanate component and an isocyanate-reactive component.

Isocyanate Component

In some embodiments, the isocyanate component comprises an isocyanate-terminated prepolymer. In some embodiments, the isocyanate-terminated prepolymer is the reaction product of a polyisocyanate and a polyol component. In such a reaction, the polyisocyanate is present in excess in order to produce an isocyanate-terminated prepolymer. As used herein, a "polyisocyanate" is any compound that contains two or more isocyanate groups. For example, polyisocyanates include dimers, trimers, etc.

In some embodiments, suitable polyisocyanates for use according to this disclosure can be selected from the group consisting of an aliphatic polyisocyanate, a cycloaliphatic polyisocyanate, an aromatic polyisocyanate, and combinations of two or more thereof. As used herein, a "polyisocyanate" is any compound that contains two or more isocyanate groups. For example, polyisocyanates may include dimers, trimers, etc. An "aromatic polyisocyanate" is a polyisocyanate that an isocyanate radical bonded to an aromatic radical and contains one or more aromatic rings. An "aliphatic polyisocyanate" contains no isocyanate radical directly bonded to an aromatic ring or is better defined as an isocyanate which contains an isocyanate radical bonded to an aliphatic radical which can be bonded to other aliphatic groups, a cycloaliphatic radical or an aromatic ring (radical). A "cycloaliphatic polyisocyanate" is a subset of aliphatic polyisocyanates, wherein the chemical chain is ring-structured.

Suitable aromatic polyisocyanates include, but are not limited to, 1,3- and 1,4-phenylene diisocyanate, 1,5-naphthylene diisocyanate, 2,6-tolulene diisocyanate ("2,6-TDI"), 2,4-tolulene diisocyanate ("2,4-TDI"), 2,4'-diphenylmethane diisocyanate ("2,4'-MDI"), 4,4'-diphenylmethane diisocyanate ("4,4'-MDI"), 3,3'-dimethyl-4,4'-biphenyldiisocyanate ("TODI"), and mixtures of two or more thereof. Suitable aliphatic polyisocyanates have 3 to 16 carbon atoms, or 4 to 12 carbon atoms, in the linear or branched alkylene residue, such as hexamethylene diisocyanate ("HDI") and 1,4-Diisocyanatobutane.

Suitable cycloaliphatic polyisocyanates have 4 to 18 carbon atoms, or 6 to 15 carbon atoms, in the cycloalkylene residue. Cycloaliphatic diisocyanates refer to both cyclically and aliphatically bound NCO groups, such as isophorone diisocyanate ("IPDI"), 1,3/1,4-diisocyanatocyclohexane 1,3-/1,4-bis(isocyanatomethyl)cyclohexane, and diisocyanatodicyclohexylmethane ("H12MDI").

Suitable aliphatic and cycloaliphatic polyisocyanates include, but are not limited to, cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate ("TIN"), decane di- and triisocyanate, undecane di- and triisocyanate and dodecane di- and triisocyanate, isophorone diisocyanate ("IPDI"), hexamethylene diisocyanate ("HDI"), diisocyanatodicyclohexylmethane ("H12MDI"), 2-methylpentane diisocyanate ("MPDI"), 2,2,4-trimethylhexamethylene diisocyanate/2,4,4-trimethylhexamethylene diisocyanate ("TMDI"), norbornane diisocyanate ("NBDI"), xylylene diisocyanate ("XDI"), tetramethylxylylene diisocyanate, and dimers, trimers, and mixtures of the of two or more thereof. Additional polyisocyanates suitable for use according to this disclosure include, but are not limited to, 4-methyl-cyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, 1,4-diisocyanato-4-methylpentane, and mixtures of the of two or more thereof.

In some embodiments, the isocyanate component has a NCO content of at least 3%, or at least 6%, or at least 10%. In some embodiments, the isocyanate component has a NCO content not to exceed 25%, or 18%, or 14%. In some embodiments, the isocyanate component has a NCO content of from 3 to 25%, or from 6 to 18%, or from 10 to 14%. NCO content is determined according to ASTM D2572. In some embodiments, the isocyanate component has viscosity at 25° C. of from 300 to 40,000 mPa-s, or from 500 to 20,000 mPa-s, or from 1,000 to 10,000 mPa-s, as measured by the method of ASTM D2196.

In some embodiments, the polyol component, to be reacted with the polyisocyanate to form the isocyanate-terminated prepolymer, comprises a polyol having a hydroxyl functionality of two or greater. As used herein, the term "hydroxyl functionality" refers to the number of isocyanate-reactive sites on a molecule. For polyols, an average hydroxyl functionality is generally the total moles of OH divided by the total moles of polyol. In some embodiments, the polyol having a functionality of two or greater and is selected from the group consisting of a polyester polyol, a polyether polyol, and mixtures thereof.

The isocyanate component can further comprise other constituents commonly known to those of ordinary skill in the art.

Isocyanate-Reactive Component

In some embodiments, the isocyanate-reactive component comprises a hydroxy-terminated polyurethane resin, a polyether polyol, a phosphate ester adhesion promoter, and, optionally, a bio-based polyol.

Suitable hydroxy-terminated polyurethane resins can be prepared through the reaction of a polyisocyanate and a polyol. In such a reaction, the polyol is present in excess in order to produce a hydroxy-terminated polyurethane resin, in other words, the stoichiometric ratio of hydroxyl groups to isocyanate groups should be higher than 1. Suitable polyisocyanates for use according to this disclosure include, but are not limited to, aromatic polyisocyanates, aliphatic polyisocyanates, cycloaliphatic polyisocyanates, and combinations of two or more thereof. Suitable polyols for use for the preparation of hydroxy-terminated polyurethane resins according to this disclosure include, but are not limited to, polyether polyol, polyester polyol, and mixtures thereof. In some embodiments, the amount of the hydroxy-terminated polyurethane resin in the isocyanate-reactive component is, by weight based on the weight of the isocyanate-reactive component, from 10 to 90 wt %, or from 20 to 85 wt %, or from 50 to 80 wt %.

In some embodiments, the polyether polyol has a hydroxy functionality of two or more (e.g., di-functional, tri-functional, and so on). In some embodiments, the polyether polyol has a hydroxyl number from 100 to 400 mg KOH/g, measured according to ASTM D4274. In some embodiments, the polyether polyol has a number average molecular weight from 100 to 3,000, from 200 to 2,500, or from 350 to 1,500. In some embodiments, the polyether polyol has a viscosity at 25° C. from 50 to 1000 cps, measured according to ASTM D4878. Commercially available examples of polyether polyols suitable for use according to this disclosure include products sold under the trade names VORANOL™ CP-450, VORANOL™ 220-260, and VORANOL™ 220-110N, each available from The Dow Chemical Company. In some embodiments, the polyether polyol further comprises a triol with molecular weight less than 300. Commercially available examples of the triol suitable for use according to this disclosure include trimethylolpropane ("TMP") available from Sigma-Aldrich. In some embodiments, the amount of the polyether polyol in the isocyanate-reactive component is, by weight based on the weight of the isocyanate-reactive component, from 4 to 50 wt %, or from 6 to 40 wt %.

In some embodiments, the phosphate ester adhesion promoter comprises a phosphate ester-based polyol. In some embodiments, the phosphate ester-based polyol is made from a tri-functional or di-functional propylene glycol, a polyphosphoric acid, and a polyisocyanate. In some embodiments, the phosphate ester-based polyol has a phosphoric acid content of less than 4 weight percent based on the weight of the phosphate ester polyol, or a phosphoric acid content of from 0.1 to 3 weight percent based on the weight of the phosphate ester polyol, or a phosphoric acid content of from 1.5 to 2.5 weight percent based on the weight of the phosphate ester polyol. In some embodiments, the phosphate ester-based polyol has a viscosity less than 40,000 cps at 25° C., or less than 30,000 cps at 25° C., as measured by the method of ASTM D2196. In some embodiments, the phosphate ester-based polyol has a hydroxyl number from 200 to 350 mg KOH/g, measured according to ASTM D4274. In some embodiments, the amount of the phosphate ester adhesion promoter in the isocyanate-reactive component is, by weight based on the weight of the isocyanate-reactive component, from 0.5 to 15 wt %, or from 1 to 5 wt %. One example of a technique for preparing a suitable phosphate ester adhesion promoter is provided in the Examples of the Disclosure, below.

In some embodiments, the bio-based polyol is a castor oil or other naturally-derived oil. Commercially available examples of castor oil suitable for use according to this disclosure include urethane grade castor oil available from Campbell & Co. In some embodiments, the amount of the bio-based polyol in the isocyanate-reactive component is, by weight based on the weight of the isocyanate-reactive component, from 0 to 50 wt %, or from 15 to 30 wt %.

In some embodiments, one or more additives can optionally be included in the adhesive compositions. Examples of suitable additives include, but are not limited to, tackifiers, plasticizers, rheology modifiers, adhesion promoters, antioxidants, fillers, colorants, surfactants, defoamers, wetting agents, leveling agents, solvents, and combinations of two or more thereof.

The isocyanate-reactive component can further comprise other constituents commonly known to those of ordinary skill in the art, e.g., additional polyols, isocyanates, etc.

In some embodiments, the mole ratio of NCO groups present in the isocyanate component to OH groups present in the isocyanate-reactive component is from 0.8 to 1.6, or from 1.0 to 1.5, or from 1.2 to 1.4. The mix ratio, by weight, for the isocyanate component and isocyanate-reactive component can be determined based upon the desired ratio of NCO groups to OH groups. In some embodiments, the mix ratio, by weight, of the isocyanate component to the isocyanate-reactive component in the final adhesive composition can be from 100:50 to 100:70, or from 100:60 to 100:66.

In some embodiments, the isocyanate component and isocyanate-reactive component can be made and sold in a package. In some embodiments, the isocyanate component and isocyanate-reactive component can each be made and sold individually.

Laminate Formation

A laminate comprising the disclosed adhesive compositions can be formed by mixing the isocyanate and isocyanate-reactive components of the adhesive composition and then applying the mixed adhesive composition to a film. As used herein, a "film" is any structure that is 0.5 mm or less in one dimension and is 1 cm or more in both of the other two dimensions. A "polymer film" is a film that is made of a polymer or mixture of polymers. The composition of a polymer film is, typically, 80 percent by weight or more by weight one or more polymers.

For instance, a layer of the mixed adhesive is applied to a surface of a first substrate. The surface of the first substrate comprising the mixed adhesive composition is brought into contact with a surface of the second substrate, and then the two substrates run through a device for applying external pressure to the first and second substrates, such as nip roller. Arrangements of such rollers in an application apparatus are commonly known in the art. The mixed adhesive composition is then cured or allowed to cure at any temperature from room temperature (i.e., approximately 25° C.) up to 50° C. or higher. In some embodiments, the coating weight of the applied adhesives to the film substrates is from 1.2 $g/m^2$ to 3.5 $g/m^2$, in some embodiments, from 1.6 $g/m^2$ to 3.0 $g/m^2$.

Suitable substrates in the laminate structure include films such as paper, woven and nonwoven fabric, metal foil, polymer films, and metal-coated polymer films. Some films optionally have a surface on which an image is printed with ink which may be in contact with the adhesive composition. The substrates are layered to form a laminate structure, with an adhesive composition according to this disclosure adhering one or more of the substrates together.

EXAMPLES OF THE DISCLOSURE

The present disclosure will now be explained in further detail by describing examples illustrating the disclosed adhesive compositions and existing adhesive compositions (collectively, "the Examples"). However, the scope of the present disclosure is not, of course, limited to the Examples.

Raw Materials

Pertinent raw materials used in the following Examples are detailed in Table 1.

TABLE 1

Raw Materials

| Material | Description | Supplier |
|---|---|---|
| MOR-FREE ™ L75-191 | Isocyanate-terminated polyurethane prepolymer | The Dow Chemical Company |
| MOR-FREE ™ L75-164 | Isocyanate-terminated polyurethane prepolymer | The Dow Chemical Company |
| MOR-FREE ™ C-411 | Polyester/polyether polyol blend | The Dow Chemical Company |
| CR-85 | Polyol blend | The Dow Chemical Company |
| VORANOL ™ CP-450 | Di-functional polyether polyol | The Dow Chemical Company |
| VORANOL ™ 220-260 | Di-functional polyether polyol | The Dow Chemical Company |
| VORANOL ™ 220-110N | Di-functional polyether polyol | The Dow Chemical Company |
| Trimethylolpropane ("TMP") | Trimethylolpropane | Sigma-Aldrich |
| Phosphate ester adhesion promoter | Phosphate ester-based polyol | The Dow Chemical Company |
| Bio-based polyol | Urethane-grade castor oil | Campbell & Co. |
| ISONATE ™ 125M | Pure diphenylmethane diisocyanate (MDI) mixture composed of approximately 98 percent 4,4'-diphenylmethane diisocyanate and 2 percent 2,4'-diphenylmethane diisocyanate | The Dow Chemical Company |
| GF-19 | High slip, low density polyethylene film, thickness 1.5 mil | Berry Plastics Corp. |
| GF-10 | Low density polyethylene film, thickness 1.0 mil | Berry Plastics Corp. |
| PET (48LBT) | Polyester film, poly(ethylene glycol - terephthalate) | E. I. du Pont de Nemours and Company |
| Nylon | Bi-axially oriented nylon 6 film, thickness 15 μm | Honeywell International Inc. |
| Met-PET | Metallized polyester film, thickness 25.4 μm | FILMtech Inc. |

Preparation of Phosphate Ester Adhesion Promoter

Add 55.1 grams of VORANOL™ CP-450 and 1.5 grams of polyphosphoric acid to a reactor under nitrogen purge at room temperature. Then set the reactor temperature to 100° C. and agitate the reactor contents for 1 hour. Bring the reactor temperature down to 50° C. and then introduce 18.4 grams of ISONATE™ 125M into the reactor. The reactor temperature increases to 80° C. due to the exothermic reaction. Control the reaction temperature at 78° C. for 2 hours. The resulting phosphate ester adhesion promoter has hydroxyl number of 293 mg KOH/g, measured according to ASTM D4274 and a viscosity of 18,000 cps at 25° C. as measured according to ASTM D2196.

Preparation of Isocyanate-Reactive Components

The isocyanate-reactive components, Examples 1 to 4 shown in Table 2, are prepared in two steps. For Example 1, in the first step, hydroxy-terminated polyurethane is produced in a reactor through the reaction between VORNAOL™ 220-260 and VORNAOL™ 200-110N with ISONATE™ 125M. In the second step, additional polyol, including VORANOL™ CP-450, VORNAOL™ 220-260, castor oil, TMP, and phosphate ester adhesion promoter are charged to the reactor and mixed with the hydroxy-terminated polyurethane formed in the first step. In a typical example of preparing the isocyanate-reactive component of Example 1, about 377 grams of VORANOL™ 220-260 is charged to a 1 Liter reactor and warmed to about 50° C. under nitrogen protection and overhead agitation. Next, about 44 grams of ISONATE™ 125M is charged to the reactor. The reaction temperature is increased with the addition of isocyanate due to reaction exotherm, bringing the reactor temperature slowly to 78° C. The reaction temperature is maintained from 78 to 82° C. Samples are taken periodically with pipets and analyzed by IR. This is continued until no NCO peak can be observed at 2275 cm$^{-1}$ in IR, indicating all isocyanate groups have been consumed and the first step reaction is complete; normally within 2 hours. Next, additional components including about 42 grams of VORANOL™ CP-450, about 210 grams of castor oil, about 14 grams of phosphate ester adhesion promoter, and about 14 grams of TMP are charged to the reactor and mixed at 70° C. for another 2 hours. The resin is then cooled to about 60° C. before being transferred and packaged for later use.

TABLE 2

Isocyanate-Reactive Component Compositions

| Raw materials | | Example 1 wt % | Example 2 wt % | Example 3 wt % | Example 4 wt % |
|---|---|---|---|---|---|
| Hydroxy-terminated polyurethane resin | VORANOL ™ 220-260 | 53.8 | 52.4 | 30.25 | 30.58 |
| | VORANOL ™ 220-110N | | | 45.37 | 45.87 |
| | ISONATE ™ 125M | 6.3 | 7.6 | 4.39 | 3.55 |
| VORANOL ™ CP 450 | | 6 | 10 | 15 | 15 |
| Castor oil | | 30 | 26 | | |
| Phosphate ester adhesion promoter | | 2 | 2 | 3 | 3 |
| TMP | | 2 | 2 | 2 | 2 |
| Total Weight | | 100.1 | 100 | 100 | 100 |

The isocyanate-reactive component of Example 5, shown in Table 3, is prepared in one-step. About 70 grams of VORANOL™ CP-450, about 182 grams of castor oil, about 367 grams of VORANOL™ 220-260, about 14 grams of phosphate ester adhesion promoter, and about 14 grams of TMP is charged to 1 Liter reactor and warmed to 50° C. under nitrogen protection and overhead agitation. Next, about 53.2 grams of ISONATE™ 125M is charged to the reactor. The reaction temperature is increased with the addition of isocyanate due to reaction exotherm, bringing the reactor temperature slowly to 78° C. The reaction temperature is maintained from 78 to 82° C. Samples are taken periodically with pipets and analyzed by IR. This is continued until no NCO peak can be observed at 2275 cm$^{-1}$ in IR, indicating all isocyanate groups have been consumed and the first step reaction is complete; normally within 2 hours. The resin is then cooled to about 60° C. before being transferred and packaged for later use.

TABLE 3

Isocyanate-Reactive Component Compositions

| | Raw materials | Example 5 wt % |
|---|---|---|
| Hydroxy-terminated polyurethane | VORANOL ™ CP 450 | 10 |
| | Castor oil | 26 |
| | Phosphate ester adhesion promoter | 2 |
| | TMP | 2 |
| | VORANOL ™ 220-260 | 52.4 |
| | ISONATE ™ 125M | 7.6 |
| | Total Weight | 100 |

The isocyanate-reactive component of Example 6, shown in Table 4, is prepared in two steps. In the first step, about 70 grams of VORANOL™ CP-450, about 182 grams of castor oil, about 367 grams of VORANOL™ 220-260, and about 14 grams of TMP are charged to a 1 Liter reactor warmed to 50° C. under nitrogen protection and overhead agitation. Next, about 53.2 grams of ISONATE™ 125M is charged to the reactor. The reaction temperature is increased with the addition of isocyanate due to reaction exotherm, bringing the reactor temperature slowly to 78° C. The reaction temperature is maintained from 78 to 82° C. Samples are taken periodically with pipets and analyzed by IR. This is continued until no NCO peak can be observed at 2275 cm$^{-1}$ in IR, indicating all isocyanate groups have been consumed and the first step reaction is complete; normally within 2 hours. Next, about 14 grams Phosphate ester adhesion promoter is charged to the reactor and mixed at 70° C. for another 2 hours. The resin is then cooled to about 60° C. before being transferred and packaged for later use.

TABLE 4

Isocyanate-Reactive Component Compositions

| | Raw Materials | Example 6 wt % |
|---|---|---|
| Hydroxy-terminated polyurethane | VORANOL ™ CP 450 | 10 |
| | Castor oil | 26 |
| | TMP | 2 |
| | VORANOL ™ 220-260 | 52.4 |
| | ISONATE ™ 125M | 7.6 |
| | Phosphate ester adhesion promoter | 2 |
| | total weight | 100 |

Adhesive Formulations

Detailed formulations of various adhesives are identified in Table 5.

TABLE 5

Adhesive Formulations

| Example ID | Isocyanate Component | Isocyanate-Reactive Component | Mixing Ratio (Isocyanate Component/ Coreactant, parts by weight) |
|---|---|---|---|
| Comparative Example 1 | MOR-FREE ™ L75-164 | MOR-FREE ™ C-411 | 100:40 |
| Comparative Example 2 | MOR-FREE ™ L75-191 | CR-85 | 100:50 |
| Example 7 | MOR-FREE ™ L75-191 | Example 1 | 100:62 |
| Example 8 | MOR-FREE ™ L75-191 | Example 2 | 100:62 |
| Example 9 | MOR-FREE ™ L75-191 | Example 3 | 100:66 |
| Example 10 | MOR-FREE ™ L75-191 | Example 4 | 100:64 |
| Example 11 | MOR-FREE ™ L75-191 | Example 5 | 100:63 |
| Example 12 | MOR-FREE ™ L75-191 | Example 6 | 100:63 |

Laminate Structures

Laminate structures are prepared using a LABO-COMBI™ laminator with the nip temperature was set to 120° F. and line speed was set to 100 feet/min Coating weight is adjusted to be about 1 to 1.2 lbs/rm (1.6 to 1.9 g/m$^2$). Around 100 feet of laminates are prepared for each formulation with some bond strips inserted to facilitate bond testing. The formed laminate structures are allowed to cure at room temperature for 1 week. Various structures are evaluated, including 48-LBT/GF-19, NYLON/GF-10, and 48LBT/Met-PET.

Test Methods and Performance Results

T-peel bond strength is measured on a 1 inch strip of laminate sample at a rate of 10 inch/minute on an Instron tensile tester with a 200 N loading cell. Three strips are tested for each laminate sample and high and mean bond strengths are recorded together with the failure mode. In the case of film tear and film stretch, the high value is reported. In other failure modes, the average T-peel bond strength is reported. Typical failure modes include: "AF" for adhesive failure (adhesive with primary), "AT" for adhesive transfer (adhesive with secondary), "AS" for adhesive split (cohesive failure of adhesive), "FT" for film tear (destruct bond), "FS" for film stretch (destruct bond), and "MT" for metal transfer.

Heat seal strength is tested on a SENCORP™ 12ASL/1 heat sealer at 350° F. for 1 second, then the bond strength test is performed on the heat sealed sample on the polyethylene side cut into 1 inch wide strips with same condition as the above bond strength test. The value recorded is the average of testing performed on triplicate samples.

Primary aromatic amines ("PAA") decay is tested after samples are cured at 25° C., 50% RH for 2 days. A cured laminate structure is folded over to form a double layer such that the polyethylene film of one layer is in contact with the polyethylene film of the other layer. The edges are then trimmed with a paper cutter to obtain a folded piece about 6.5 inches×7 inches. The edges are then heat sealed to form a pouch with an interior size of 5.5 inches×5.6 inches. The pouches are then filled with 100 mL of 3% acetic acid. These pouches are extracted at 70° C. in the air circulation oven for a period of 2 hours. After quench cooling of the pouches in cold tap water, allow the test solution to equilibrate at room temperature, the 100 ml test solution is transferred into a beaker. The amount of primary aromatic amines extracted to 3% acetic acid solution is determined by utilizing a classical colorimetric method.

Boil-in-bag testing of the laminate structures is also performed. A cured laminate structure is folded over to form a double layer such that the polyethylene film of one layer is in contact with the polyethylene film of the other layer. The edges are then trimmed with a paper cutter to obtain a folded piece about 5 inches×7 inches. The edges are then heat sealed to form a pouch with an interior size of 4 inches×6 inches. The pouches are then filled 100 mL of 1/1/1 sauce (i.e., a blend of equal parts by weight of catsup, vinegar and vegetable oil) through the open edge. After filling, the pouch is sealed in a manner that minimizes the air entrapped inside of the pouch. The filled pouches are then carefully placed in boiling water and kept immersed in the water for 30 minutes. When completed, the extent of tunneling, delamination, and/or leakage is compared with marked pre-existing flaws. The bags are then emptied and at least three 1 inch strips are cut from the pouches and T-peel bond strength is measured as soon as possible thereafter.

Ink smearing resistance test is performed as follows. A drop of adhesive mixture is added onto an ink coated substrate to form a 0.75-1 cm$^2$ area of samples, with 50 grams standard weight on a 6" cotton tipped applicator at 45-60° angle on the 0.75-1 cm$^2$ area samples. Initial 5 cycle rubs after 1 minute of contamination, then 5 cycle rubs after 20 minutes of contamination. In terms of performance, "0" indicates no damage to the ink, "1" indicates slight removal of the ink, 3 indicates significant removal of the ink, and "3" indicates total removal of the ink. The ink coated substrate is from Flexa (Colombia): polyurethane solvent based ink printed by flexographic machine The results from the various performance tests are summarized in Table 6.

a phosphate ester adhesion promoter; and
optionally, a bio-based polyol.

Embodiment 2. The two-component solventless adhesive composition of any preceding or succeeding Embodiment, wherein the hydroxy-terminated polyurethane resin in the isocyanate-reactive component is a reaction product of a polyisocyanate and a polyol component.

Embodiment 3. The two-component solventless adhesive composition of any preceding or succeeding Embodiment, wherein the polyisocyanate is 4,4'-methylene diphenyl diisocyanate.

Embodiment 4. The two-component solventless adhesive composition of any preceding or succeeding Embodiment, wherein the polyol component comprises at least one selected from the group consisting of a polyether polyol, a polyester polyol, or mixtures thereof.

Embodiment 5. The two-component solventless adhesive composition of any preceding or succeeding Embodiment, wherein the hydroxy-terminated polyurethane resin accounts for 10 to 90 percent of the total weight of the isocyanate-reactive component.

Embodiment 6. The two-component solventless adhesive composition of any preceding or succeeding Embodiment, wherein the hydroxy-terminated polyurethane resin accounts for 20 to 80 percent of the total weight of the isocyanate-reactive component.

Embodiment 7. The two-component solventless adhesive composition of any preceding or succeeding Embodiment, wherein the polyether polyol accounts for 4 to 50 percent of the total weight of the isocyanate-reactive component.

TABLE 6

Laminate Structure Performance Test Results

| Adhesive | Structure | PAA (ppb) | Bond strength (g/in) 1 day | Bond strength (g/in) 7 day | Boil-in-bag | Ink Smearing | Heat seal strength (bond test (g/in ± STD) |
|---|---|---|---|---|---|---|---|
| Comparative Example 1 | 48LBT/Met-PET | | 135, AF | 80, AF | | 1-2 | |
| | 48LBT/GF-19 | | 2057, FT | 2098, FT | 330, FT | | 6524 ± 100, FT |
| | NYLON/GF-10 | 24.9 | 1724, FT | 2229, FT | 527, FT | | 2969 ± 205, delam |
| Comparative Example 2 | 48LBT/Met-PET | | 82, AF | 70, AF | | 1 | |
| | 48LBT/GF-19 | | 1054, FT | 1439, FT | 182, FT/AS | | 5734 ± 154, FT |
| | NYLON/GF-10 | 0.825 | 1587, FT | 1843, FT | 577, FT/AT | | 2843 ± 314, delam |
| Example 7 | 48LBT/Met-PET | | 238, AS | 250, AS | | 0 | |
| | 48LBT/GF-19 | | 1564, FT | 1303, FT | 462, FT/AT | | 6606 ± 227, FT |
| | NYLON/GF-10 | 0.933 | 1304, FT | 1536, FT | 897, FS | | 2399 ± 30, delam |
| Example 8 | 48LBT/Met-PET | | 241, AS | 247, AS | | 0 | |
| | 48LBT/GF-19 | | 1530, FT | 1250, FT | 545, FT | | 6229 ± 538, FT |
| | NYLON/GF-10 | 1.678 | 1141, FT | 1506, FT | 772, FT/AT | | 2341 ± 55, delam |
| Example 9 | 48LBT/Met-PET | | 246, AS | 220, AF | | 0 | |
| | 48LBT/GF-19 | | 1482, FT | 1496, FT | 475, FT/AS | | 6068 ± 430, FT |
| | NYLON/GF-10 | 8.767 | 2147, FT | 2312, FT | 872, FT/AT | | 2439 ± 270, delam |
| Example 10 | 48LBT/Met-PET | | 237, AS/FT | 223, AF | | 0 | |
| | 48LBT/GF-19 | | 1530, FT | 1499, FT | 491, FT/AT | | 6085 ± 191, FT |
| | NYLON/GF-10 | 4.215 | 1770, FT | 1600, FT | 699, FT/AT | | 2534 ± 102, delam |
| Example 11 | NYLON/GF-10 | 8.102 | 963, FT | 902, FT | | 0 | 2433 ± 274, delam |
| Example 12 | NYLON/GF-10 | 8.693 | 1037, FT | 974, FT | | 0 | 2092 ± 266, delam |

In addition to the embodiments described above and those set forth in the Examples, many embodiments of specific combinations are within the scope of the disclosure, some of which are described below:

Embodiment 1. A two-component solventless adhesive composition, comprising:
an isocyanate component comprising an isocyanate-terminated prepolymer; and
an isocyanate-reactive component comprising:
a hydroxy-terminated polyurethane resin;
a polyether polyol;

Embodiment 8. The two-component solventless adhesive composition of any preceding or succeeding Embodiment, wherein the phosphate ester is made from a tri-functional propylene glycol, a polyphosphoric acid, and a polyisocyanate, the phosphate ester having a phosphoric acid content of less than 3 weight percent based on the weight of the phosphate ester.

Embodiment 9. The two-component solventless adhesive composition of any preceding or succeeding Embodiment, wherein the phosphate ester adhesion promoter accounts for 0.5 to 15 percent of the total weight of the isocyanate-reactive component.

Embodiment 10. The two-component solventless adhesive composition of any preceding or succeeding Embodiment, wherein the phosphate ester adhesion promoter accounts for 1 to 5 percent of the total weight of the isocyanate-reactive component.

Embodiment 11. The two-component solventless adhesive composition of any preceding or succeeding Embodiment, wherein the bio-based polyol accounts for 0 to 50 percent of the total weight of the isocyanate-reactive component.

Embodiment 12. The two-component solventless adhesive composition of any preceding or succeeding Embodiment, wherein the bio-based polyol is castor oil.

Embodiment 13. The two-component solventless adhesive composition of any preceding or succeeding Embodiment, wherein the mole ratio of the NCO groups present in the isocyanate component to OH groups present in the isocyanate-reactive component is from 0.8 to 1.6.

Embodiment 14. The two-component solventless adhesive composition of any preceding or succeeding Embodiment, wherein the mole ratio of the NCO groups present in the isocyanate component to OH groups present in the isocyanate-reactive component is from 1.0 to 1.5.

Embodiment 15. The two-component solventless adhesive composition of any preceding or succeeding Embodiment, wherein the mole ratio of the NCO groups present in the isocyanate component to OH groups present in the isocyanate-reactive component is from 1.2 to 1.4.

Embodiment 16. A laminate structure comprising the two-component solventless adhesive composition of any preceding or succeeding Embodiment.

Embodiment 17. A method for forming a laminate structure, comprising:
  forming an adhesive composition by mixing an isocyanate adhesive component comprising an isocyanate-terminated prepolymer and an isocyanate-reactive adhesive component comprising a hydroxy-terminated polyurethane resin, a polyether polyol, a phosphate ester adhesion promoter, and optionally, a bio-based polyol;
  applying the adhesive composition to a surface of a first substrate; and
  bringing a surface of a second substrate into contact with the adhesive composition on the surface of the first substrate, thereby forming the laminate structure.

Embodiment 18. The method for forming a laminate structure of any preceding or succeeding Embodiment, wherein mixing the isocyanate adhesive component and the isocyanate-reactive adhesive component occurs at a mole ratio of the NCO groups present in the isocyanate component to OH groups present in the isocyanate-reactive component is from 0.8 to 1.6.

Embodiment 19. The method for forming a laminate structure of any preceding or succeeding Embodiment, wherein the first substrate and the second substrate are each independently selected from the group consisting of a wood material, a metallic material, a plastic material, a composite material, a paper material, a fabric material, and combinations of two or more thereof.

What is claimed is:

1. A two-component solventless adhesive composition, comprising:
  an isocyanate component comprising an isocyanate-terminated prepolymer; and
  an isocyanate-reactive component comprising:
    a hydroxy-terminated polyurethane resin which is a reaction product of a polyisocyanate and a polyol component;
    a polyether polyol;
    a phosphate ester adhesion promoter made from a tri-functional propylene glycol, a polyphosphoric acid, and a polyisocyanate; and
    optionally, a bio-based polyol;
    wherein the phosphate ester adhesion promoter has a phosphoric acid content of less than 4 weight percent based on the weight of the phosphate ester adhesion promoter; and
    wherein the phosphate ester adhesion promoter accounts for 0.5 to 15 percent of the total weight of the isocyanate-reactive component.

2. The two-component solventless adhesive composition of claim 1, wherein the polyisocyanate is 4,4'-methylene diphenyl diisocyanate.

3. The two-component solventless adhesive composition of claim 1, wherein the polyol component comprises at least one selected from the group consisting of a polyether polyol, a polyester polyol, or mixtures thereof.

4. The two-component solventless adhesive composition of claim 1, wherein the hydroxy-terminated polyurethane resin accounts for 10 to 90 percent of the total weight of the isocyanate-reactive component.

5. The two-component solventless adhesive composition of claim 1, wherein the hydroxy-terminated polyurethane resin accounts for 20 to 80 percent of the total weight of the isocyanate-reactive component.

6. The two-component solventless adhesive composition of claim 1, wherein the polyether polyol accounts for 4 to 50 percent of the total weight of the isocyanate-reactive component.

7. The two-component solventless adhesive composition of claim 1, wherein the phosphate ester adhesion promoter accounts for 1 to 5 percent of the total weight of the isocyanate-reactive component.

8. The two-component solventless adhesive composition of claim 1, wherein the bio-based polyol accounts for 0 to 50 percent of the total weight of the isocyanate-reactive component.

9. The two-component solventless adhesive composition of claim 1, wherein the bio-based polyol is castor oil.

10. The two-component solventless adhesive composition of claim 1, wherein the mole ratio of the NCO groups present in the isocyanate component to OH groups present in the isocyanate-reactive component is from 0.8 to 1.6.

11. The two-component solventless adhesive composition of claim 1, wherein the mole ratio of the NCO groups present in the isocyanate component to OH groups present in the isocyanate-reactive component is from 1.0 to 1.5.

12. The two-component solventless adhesive composition of claim 1, wherein the mole ratio of the NCO groups present in the isocyanate component to OH groups present in the isocyanate-reactive component is from 1.2 to 1.4.

13. A laminate structure comprising the two-component solventless adhesive composition of claim 1.

14. A method for forming a laminate structure, comprising:
  forming an adhesive composition according to claim 1 by mixing an isocyanate adhesive component comprising an isocyanate-terminated prepolymer and an isocyanate-reactive adhesive component comprising a hydroxy-terminated polyurethane resin, a polyether polyol, a phosphate ester adhesion promoter, and optionally, a bio-based polyol;

applying the adhesive composition to a surface of a first substrate; and bringing a surface of a second substrate into contact with the adhesive composition on the surface of the first substrate, thereby forming the laminate structure.

15. The method for forming a laminate structure of claim 14, wherein mixing the isocyanate adhesive component and the isocyanate-reactive adhesive component occurs at a mole ratio of the NCO groups present in the isocyanate component to OH groups present in the isocyanate-reactive component is from 0.8 to 1.6.

16. The method for forming a laminate structure of claim 14, wherein the first substrate and the second substrate are each independently selected from the group consisting of a wood material, a metallic material, a plastic material, a composite material, a paper material, a fabric material, and combinations of two or more thereof.

* * * * *